(No Model.) 2 Sheets—Sheet 1.
J. HUNT.
CULTIVATOR ATTACHMENT FOR GATHERING POTATO BUGS.
No. 387,720. Patented Aug. 14, 1888.
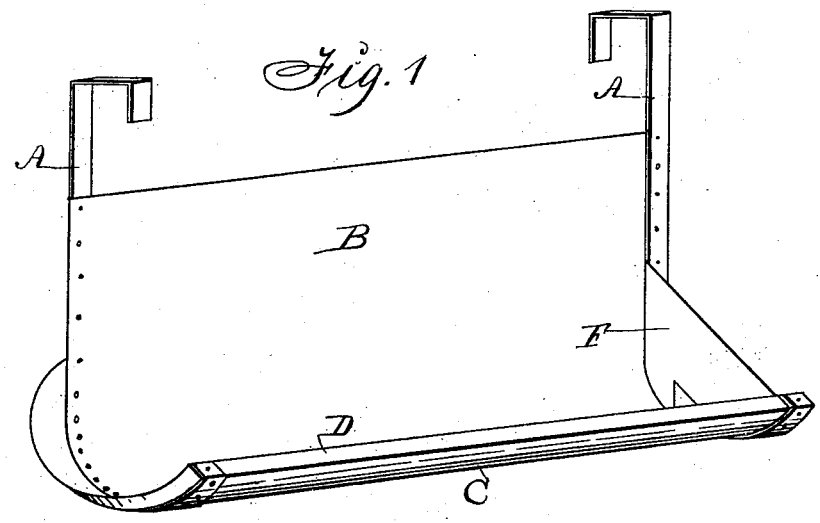
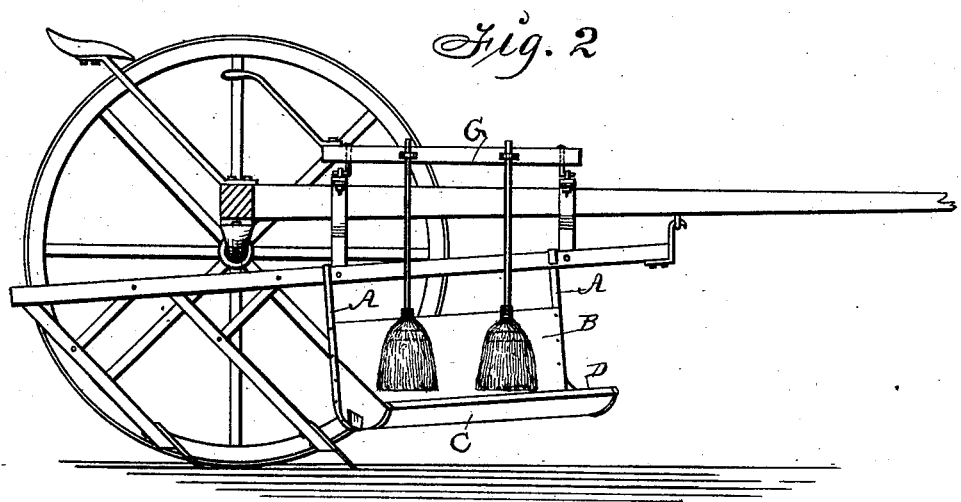
Witnesses:
R. H. Orwig.
M. P. Smith.
Inventor:
Joseph Hunt,
By Thomas G. Orwig, Att'y.

(No Model.) 2 Sheets—Sheet 2.
J. HUNT.
CULTIVATOR ATTACHMENT FOR GATHERING POTATO BUGS.
No. 387,720. Patented Aug. 14, 1888.
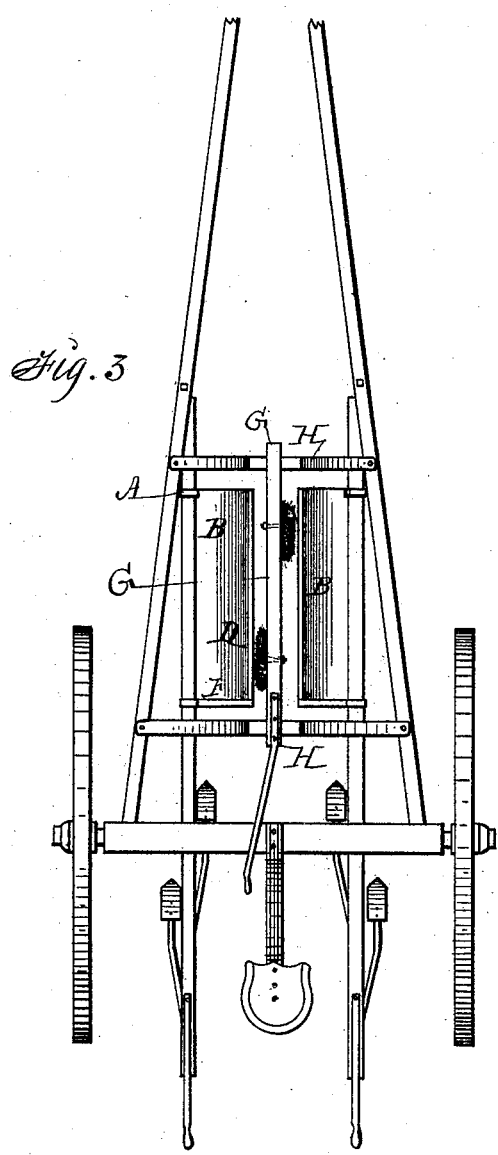
Witnesses:
M. P. Smith
R. H. Orwig
Inventor:
Joseph Hunt,
By Thomas G. Orwig, Atty.

UNITED STATES PATENT OFFICE.

JOSEPH HUNT, OF ACKLEY, IOWA.

CULTIVATOR ATTACHMENT FOR GATHERING POTATO-BUGS.

SPECIFICATION forming part of Letters Patent No. 387,720, dated August 14, 1888.

Application filed September 26, 1887. Serial No. 250,777. (No model.)

*To all whom it may concern:*

Be it known that I, JOSEPH HUNT, a citizen of the United States of America, and a resident of Ackley, in the county of Hardin and State of Iowa, have invented a Cultivator Attachment for Gathering Potato-Bugs, &c., of which the following is a specification.

My object is to brush potato-bugs from vines at the same time that a cultivator is operated to loosen the ground and kill the weeds.

My invention consists in the construction and combination of scoop-shaped traps and brooms with the beams of a straddle-row cultivator, as hereinafter set forth, in such a manner that one of the traps will be advanced on each side of a row of vines simultaneously with the beams and standards and shovels of the cultivator, in such a manner that the brooms can be vibrated to brush bugs from the vines in a row, so that they will fall into the traps, to be carried therein until taken out and destroyed.

Figure 1 of the accompanying drawings is a perspective view of a skeleton frame and trap adapted to be attached to and suspended from a cultivator-beam. Fig. 2 is a view of a half of a cultivator showing one of my traps and two brooms attached thereto. Fig. 3 is a top view of a cultivator having my complete attachment applied as required for practical use.

A represents a skeleton metal frame adapted to be covered with sheet metal, as required to produce a scoop or trap.

B is a sheet-metal plate about two feet square, bent to conform with the shape of the frame, to which it is rigidly fixed by means of rivets. The concave C at the bottom of the complete device is about nine inches wide.

D is a flange about five inches wide on the inner and free edge of the scoop or concave, that prevents potato-vines from brushing bugs out of the trap as it is advanced partly under the vines.

F is a piece of plate metal fitted and fixed in the rear end of the concave or trap. An opening in this end, provided with a slide for closing it at pleasure, facilitates the removal of bugs gathered in the trap.

G is a wooden bar hinged to bearers H, that are fixed to the carriage-frame. Brooms are fixed to the bar G in such a manner that they can be vibrated with the bar to sweep bugs from the vines, and into the scoops or traps as the cultivator is advanced astride of a row of potato-vines. The brooms are adjustably connected with the bar G, by means of suitable clamping devices, in such a manner that they can be readily raised and lowered as required to suit potato-vines of different size. A handle on the rear end of the bar G and within reach of the driver on the seat enables the driver to vibrate the bar as required to operate the brooms.

I am aware that receptacles of different forms have been fixed to a frame supported upon wheels, and vibrating brush devices combined therewith, in such a manner that the complete machine could be advanced astride of a row of vines to gather beetles therefrom; but my manner of constructing and combining traps and brooms with the beams of a cultivator so that the operation of gathering bugs and the cultivation of the vines can be performed simultaneously is novel and greatly advantageous.

I claim as my invention—

In a straddle-row cultivator having an outwardly-projecting scoop-shaped trap device fixed direct to each one of the two parallel cultivator-beams, and a vibrating bar carrying brooms suspended upon supports fixed to the same parallel beams, said vibrating bar having a handle secured to one end and within the reach of the driver, for the purpose of operating the same at will, and arranged and combined to operate in the manner set forth, for the purpose of gathering bugs from the vines at the same time the vines are cultivated.

JOSEPH HUNT.

Witnesses:
R. H. ORWIG,
THOMAS G. ORWIG.